(12) United States Patent
Liu et al.

(10) Patent No.: US 9,800,591 B2
(45) Date of Patent: Oct. 24, 2017

(54) METHOD AND APPARATUS FOR PROCESSING PACKET ON TRILL NETWORK

(71) Applicant: Huawei Technologies Co., Ltd., Shenzhen, Guangdong (CN)

(72) Inventors: Shuming Liu, Nanjing (CN); Ying Xie, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 167 days.

(21) Appl. No.: 14/811,591

(22) Filed: Jul. 28, 2015

(65) Prior Publication Data

US 2015/0334124 A1    Nov. 19, 2015

Related U.S. Application Data

(63) Continuation of application No. PCT/CN2013/071194, filed on Jan. 31, 2013.

(51) Int. Cl.
*H04L 29/06*    (2006.01)
*H04L 12/66*    (2006.01)
*H04L 12/64*    (2006.01)

(52) U.S. Cl.
CPC ...... *H04L 63/1408* (2013.01); *H04L 12/6418* (2013.01); *H04L 12/66* (2013.01); *H04L 63/02* (2013.01); *H04L 63/14* (2013.01); *H04L 63/1441* (2013.01)

(58) Field of Classification Search
USPC ........................................................ 726/11
See application file for complete search history.

(56) References Cited

U.S. PATENT DOCUMENTS

| | | | |
|---|---|---|---|
| 2005/0086524 A1 | 4/2005 | Cavanaugh | |
| 2007/0121617 A1* | 5/2007 | Kanekar | H04L 12/4641 370/389 |
| 2008/0165778 A1* | 7/2008 | Ertemalp | H04L 12/4641 370/392 |
| 2010/0293250 A1* | 11/2010 | Ankaiah | H04L 12/56 709/219 |
| 2012/0054865 A1* | 3/2012 | Qin | H04L 63/0236 726/22 |
| 2013/0259050 A1* | 10/2013 | Eastlake, III | H04L 45/74 370/392 |

(Continued)

FOREIGN PATENT DOCUMENTS

| | | |
|---|---|---|
| CN | 101699796 A | 4/2010 |
| CN | 101917423 A | 12/2010 |
| CN | 102118303 A | 7/2011 |

OTHER PUBLICATIONS

Internet Engineering Task Force (IETF) Request for Comments: 6325 R. Perlman et al; Jul. 2011.*

*Primary Examiner* — Jason Lee

(57) ABSTRACT

The present invention provides a method for processing a packet on a TRILL network, relates to the field of communications, and can effectively defend against a network packet attack. The method includes: receiving a packet sent by a device on a network; if it is determined that the device is a trusted RB, giving up performing a security check on the packet coming from the device; and if it is determined that the device is not a trusted RB, performing a security check on the packet coming from the device. The present invention further provides a corresponding apparatus.

6 Claims, 3 Drawing Sheets

(56) References Cited

U.S. PATENT DOCUMENTS

2014/0086041 A1* 3/2014 Shah .................. H04L 12/44
                                                370/218
2014/0101336 A1* 4/2014 Yang .................. H04L 45/02
                                                709/244

* cited by examiner

METHOD AND APPARATUS FOR PROCESSING PACKET ON TRILL NETWORK

CROSS-REFERENCE TO RELATED APPLICATIONS

This application is a continuation of International Application No. PCT/CN2013/071194, filed on Jan. 31, 2013, which is hereby incorporated by reference in its entirety.

TECHNICAL FIELD

This application relates to the field of communications, and in particular, to a method and an apparatus for processing a packet on a Transparent Interconnection of Lots of Links (TRILL) network.

BACKGROUND

A switch on a TRILL network has both a Layer 2 forwarding function and a Layer 3 forwarding function, and is generally referred to as a Routing Bridge (RBridge or RB). The TRILL runs on a data link layer, that is, a second layer in an Open System Interconnection (English: OSI) model, and uses link-state routing on the data link layer.

A general manner of defending against a packet attack is Dynamic Host Configuration Protocol snooping (DHCP snooping). A network device executing DHCP snooping presets some physical ports on the network device to be used for transmission of traffic from a network side, and presets some other physical ports to be used for transmission of traffic from a user side. When performing a security check, the network device executing DHCP snooping does not perform a security check on the traffic coming from the network side, but performs a security check on the traffic coming from the user side, and only allows a packet whose Internet Protocol (IP) address comes from a DHCP snooping binding table to pass. The traffic from the network side and the traffic from the user side are transmitted by using different physical ports, but a packet for launching the attack usually comes from the traffic from the user side. Therefore, adoption of this manner of performing a security check on the traffic from the user side can defend against the attack to some extent.

However, a topology structure of the TRILL network may be in a ring shape or a mesh shape. On the TRILL network whose topology structure is in the ring shape or the mesh shape, a physical port on a network device possibly receives not only the traffic from the user side but also the traffic from the network side. In this case, this network device cannot distinguish the traffic from the user side from the traffic from the network side based on the physical port, and therefore cannot effectively defend against the attack.

SUMMARY

The embodiments of the present invention provide a method and an apparatus for processing a packet on a TRILL network, which can effectively defend against a network packet attack, thereby improving network security.

According to a first aspect, a method for processing a packet on a TRILL network is provided, where the method includes:

receiving a packet sent by a device on a network;

if it is determined that the device is a trusted RB, giving up performing a security check on the packet coming from the device; and if it is determined that the device is not a trusted RB, performing a security check on the packet coming from the device.

In a first implementation manner of the first aspect, the determining that the device is a trusted routing bridge includes:

determining that the received packet is a TRILL packet and that the TRILL packet is a TRILL packet sent by a trusted routing bridge.

With reference to the first aspect or the first possible implementation manner of the first aspect, in a second possible implementation manner of the first aspect, before the receiving a packet sent by a device on a network, the method further includes:

receiving a Dynamic Host Configuration Protocol acknowledgement packet, and only in a case in which it is determined that a device that sends the Dynamic Host Configuration Protocol acknowledgement packet is a trusted RB, creating a DHCP-Snooping binding entry according to the Dynamic Host Configuration Protocol acknowledgement packet.

With reference to the second possible implementation manner of the first aspect, in a third possible implementation manner of the first aspect, the performing a security check on the packet coming from the device includes:

performing, according to a DHCP-Snooping binding table, DHCP-Snooping on the packet coming from the device, where the DHCP-Snooping binding table includes the DHCP-Snooping binding entry.

With reference to the first aspect or the first possible implementation manner of the first aspect, in a fourth possible implementation manner, before the receiving a packet sent by a device on a network, the method further includes:

receiving a Dynamic Host Configuration Protocol acknowledgement packet, and creating a DHCP-Snooping binding entry according to the Dynamic Host Configuration Protocol acknowledgement packet.

With reference to the fourth possible implementation manner of the first aspect, in a fifth possible implementation manner, the performing a security check on the packet coming from the device includes:

performing, according to a DHCP-Snooping binding table, DHCP-Snooping on the packet coming from the device, where the DHCP-Snooping binding table includes the DHCP-Snooping binding entry.

According to a second aspect, an apparatus for processing a packet on a TRILL network is provided, where the apparatus includes:

a receiving unit, configured to receive a packet sent by a device on a network; and a security check unit, configured to: if it is determined that the device is a trusted RB, give up performing a security check on the packet coming from the device; and if it is determined that the device is not a trusted RB, perform a security check on the packet coming from the device.

In a first implementation manner of the second aspect, the apparatus further includes a determining unit, where:

the determining unit is configured to determine that the received packet is a TRILL packet and that the TRILL packet is a TRILL packet sent by a trusted routing bridge.

With reference to the second aspect or the first possible implementation manner of the second aspect, in a second possible implementation manner of the second aspect, the apparatus further includes: a binding entry creation unit;

the receiving unit is configured to receive a Dynamic Host Configuration Protocol acknowledgement packet; and the binding entry creation unit is configured to: only in a case in which it is determined that a device that sends the Dynamic Host Configuration Protocol acknowledgement packet is a trusted RB, create a DHCP-Snooping binding entry according to the Dynamic Host Configuration Protocol acknowledgement packet received by the receiving unit.

With reference to the second possible implementation manner of the second aspect, in a third possible implementation manner of the second aspect, the security check unit is specifically configured to perform, according to a DHCP-Snooping binding table, DHCP-Snooping on the packet coming from the device, where the DHCP-Snooping binding table includes the DHCP-Snooping binding entry.

With reference to the second aspect or the first possible implementation manner of the second aspect, in a fourth possible implementation manner, the apparatus further includes a binding entry creation unit;

the receiving unit is configured to receive a Dynamic Host Configuration Protocol acknowledgement packet; and the binding entry creation unit is configured to create a DHCP-Snooping binding entry according to the Dynamic Host Configuration Protocol acknowledgement packet received by the receiving unit.

With reference to the fourth possible implementation manner of the second aspect, in a fifth possible implementation manner, the security check unit is specifically configured to:

perform, according to a DHCP-Snooping binding table, DHCP-Snooping on the packet coming from the device, where the DHCP-Snooping binding table includes the DHCP-Snooping binding entry.

According to a third aspect, an RB is provided, where RB includes a processor, a communications interface, a memory, and a bus, where:

the processor, the communications interface, and the memory implement mutual communication by using the bus;

the communications interface is configured to communicate with a peripheral device;

the memory is configured to store a program;

the processor is configured to execute the program; and the processor is configured to read the program in the memory, and execute: receiving a packet sent by a device on a network; if it is determined that the device is a trusted RB, giving up performing a security check on the packet coming from the device; and if it is determined that the device is not a trusted RB, performing a security check on the packet coming from the device.

In a first implementation manner of the third aspect, the processor is further configured to execute: determining that the received packet is a TRILL packet and that the TRILL packet is a TRILL packet sent by a trusted routing bridge.

With reference to the third aspect or the first possible implementation manner of the third aspect, in a second possible implementation manner of the third aspect, the processor is further configured to execute: before receiving the packet sent by the device on the network, receiving a Dynamic Host Configuration Protocol acknowledgement packet, and only in a case in which it is determined that a device that sends the Dynamic Host Configuration Protocol acknowledgement packet is a trusted RB, creating a DHCP-Snooping binding entry according to the Dynamic Host Configuration Protocol acknowledgement packet.

With reference to the second possible implementation manner of the third aspect, in a third possible implementation manner of the third aspect, the processor is further configured to execute: performing, according to a DHCP-Snooping binding table, DHCP-Snooping on the packet coming from the device, where the DHCP-Snooping binding table includes the DHCP-Snooping binding entry.

With reference to the third aspect or the first possible implementation manner of the third aspect, in a fourth possible implementation manner, the processor is further configured to execute: before receiving the packet sent by the device on the network, receiving a Dynamic Host Configuration Protocol acknowledgement packet, and creating a DHCP-Snooping binding entry according to the Dynamic Host Configuration Protocol acknowledgement packet.

With reference to the fourth possible implementation manner of the third aspect, in a fifth possible implementation manner, the processor is configured to execute: performing, according to a DHCP-Snooping binding table, DHCP-Snooping on the packet coming from the device, where the DHCP-Snooping binding table includes the DHCP-Snooping binding entry.

By using the foregoing technical solutions, in the method and the apparatus for processing a packet on a TRILL network that are provided by the embodiments of the present invention, a security check is not performed based on a physical port, but whether to perform a security check is determined based on an RB. When a packet comes from a trusted RB, no security check is performed on the packet coming from the trusted RB, and when a packet does not come from a trusted RB, a security check is performed on the packet. In this way, the trusted RB is configured in advance by a user; therefore, packet security can be ensured to the utmost extent, and a network packet attack can be effectively defended against, thereby improving network security.

BRIEF DESCRIPTION OF THE DRAWINGS

To describe technical solutions in embodiments of the present invention more clearly, the following briefly introduces accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
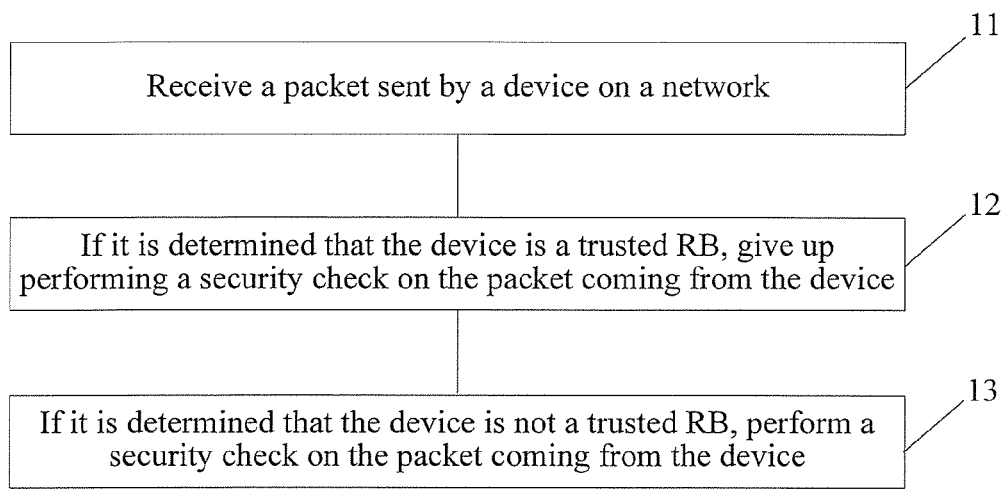
FIG. 1 is a flowchart of a method for processing a packet on a TRILL network according to an embodiment of the present invention.

The following clearly describes technical solutions in embodiments of the present invention with reference to accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An embodiment of the present invention provides a method for processing a packet on a TRILL network, which can be applied to an edge RB on the TRILL network. In this embodiment of the present invention, the "edge RB" refers to an RB that is disposed on an edge of the TRILL network. In other words, the edge RB is an RB that is on the TRILL network and adjacent to another network, for example, an Ethernet, outside the TRILL network. The edge RB is connected to a terminal device and a device on a network side by using the another network, for example, the Ethernet, and is connected to an RB on the TRILL network by using the TRILL network, where a packet sent by the terminal device is traffic from a user side, and a packet sent by the device on the network side is traffic from the network side.

In this embodiment of the present invention, a DHCP snooping technology is used on the TRILL network, and setting of a physical port in traditional DHCP snooping is replaced with setting of the RB, so that a network packet attack can be effectively defended against, thereby improving network security.

To better understand the present invention, the following briefly describes DHCP snooping that is applied to the TRILL network in this embodiment of the present invention.

Configuration Phase:

An edge RB executing a security check enables a DHCP snooping function, that is, the edge RB executes DHCP snooping. On the edge RB executing a security check, some edge RBs on the TRILL network are configured in advance as trusted RBs, where the trusted RBs may be specified by a user according to networking conditions. For example, edge RBs that are on the TRILL network and are connected only to the device on the network side are configured as trusted RBs. For another example, in a case in which a terminal device connected to the edge RB is operated by a trusty user, the edge RBs that are on the TRILL network and are connected only to the device on the network side are configured as trusted RBs, and edge RBs on the TRILL network, to which all terminal devices operated by the trusty user are connected, are configured as trusted RBs. In this embodiment of the present invention, no security check is performed on traffic that comes from a trusted RB and is received by an edge RB. In other words, the "trusted RBs" are those RBs that send, to the edge RB, traffic on which no security check needs to be performed.

Interaction Phase:

1. A DHCP client broadcasts a DHCP discover packet.
2. After receiving the DHCP discover packet, an edge RB broadcasts the DHCP discover packet.
3. After receiving the DHCP discover packet, a DHCP server sends a DHCP offer packet.
4. The edge RB forwards the DHCP offer packet to the DHCP client.
5. The DHCP client sends a DHCP request packet.
6. The edge RB forwards the DHCP request packet to the DHCP server.
7. After receiving the DHCP request packet, the DHCP server sends a DHCP acknowledgement packet.
8. The edge RB creates a DHCP-Snooping binding entry according to a field of your IP address (yiaddr) in the DHCP acknowledgement packet, and forwards the DHCP acknowledgement packet to the DHCP client. The DHCP-Snooping binding entry is an entry in a DHCP-Snooping binding table.

After the foregoing process, the edge RB can create the DHCP-Snooping binding entry, where the DHCP-Snooping binding entry includes content assigned by the DHCP server to the DHCP client, such as an IP address, and then, when determining that a packet does not come from the trusted RB, the edge RB can perform a security check on the packet according to the DHCP-Snooping binding entry. In this way, the network packet attack can be effectively defended against, thereby improving network security.

FIG. 1 is a flowchart of a method for processing a packet on a TRILL network according to an embodiment of the present invention. Referring to FIG. 1, this embodiment of the present invention provides the method for processing a packet on a TRILL network, where the method is described based on an edge RB, and includes:

11: Receive a packet sent by a device on a network.

The "network" in this embodiment of the present invention is not limited, may be the TRILL network, and may also be an Ethernet, or the like.

The device on the network may be a terminal device on the Ethernet, which is adjacently connected to the edge RB, for example, a personal computer, a tablet, a mobile phone, an IP phone, a network printer, a personal digital assistant (PDA), a mobile Internet device (MID), or an e-book reader, and may also be an RB on the TRILL network.

12: If it is determined that the device is a trusted RB, give up performing a security check on the packet coming from the device.

Performing a security check on the packet includes: performing DHCP snooping on the packet.

After receiving the packet, an edge RB executing a security check may determine whether the device is a trusted RB according to the received packet.

The trusted RB refers to an edge RB that sends a packet on which no security check needs to be performed.

In this embodiment of the present invention, in a case in which the packet received by the edge RB executing a security check is a TRILL packet, and the TRILL packet is a TRILL packet sent by a trusted RB, the edge RB executing a security check determines that the device is a trusted RB. In a case in which the packet is not a TRILL packet, and in a case in which the packet is a TRILL packet and the TRILL packet is not a TRILL packet sent by a trusted RB, the edge RB executing a security check determines that the device is not a trusted RB.

When forwarding a packet coming from another network, the edge RB on the TRILL network adds a TRILL header to the packet to form a TRILL packet, where an ingress RBridge nickname in the TRILL header is a nickname of the edge RB. In a process in which the TRILL packet is transmitted on the TRILL network, the ingress RBridge nickname in the TRILL header is not changed. In this way, the edge RB executing a security check may determine whether the packet includes a TRILL header, to determine whether the packet is a TRILL packet. Nicknames of trusted RBs may be stored in advance in the edge RB executing a security check, and whether the device that sends the packet is a trusted RB may be determined by determining whether the ingress RBridge nickname in the TRILL header is a nickname of a trusted RB that is stored in advance.

The edge RB executing a security check may use the ingress RBridge nickname as a search object, and search for the ingress RBridge nickname in the nicknames of the trusted RBs that are stored in advance. If the ingress RBridge nickname can be found, it is determined that the device is a trusted RB, and if the ingress RBridge nickname cannot be found, the device is not a trusted RB.

13: If it is determined that the device is not a trusted RB, perform a security check on the packet coming from the device.

In this embodiment of the present invention, before the receiving a packet sent by a device on a network in step 11, the method for processing a packet on a TRILL network provided by this embodiment of the present invention may further include:

storing the nicknames of the trusted RBs in advance, where in this embodiment of the present invention, the trusted RBs that are stored in advance may be specified by a user according to networking conditions.

In this embodiment of the present invention, performing a security check on packets coming from those devices that are not the trusted RBs specifically may be: performing DHCP-Snooping on these packets according to a DHCP-Snooping binding table. The DHCP-Snooping binding table includes a DHCP-Snooping binding entry. The edge RB executing a security check creates the DHCP-Snooping binding entry according to a DHCP acknowledgement packet. Specifically, the edge RB executing a security check creates the DHCP-Snooping binding entry according to a field of yiaddr in the DHCP acknowledgement packet. Optionally, after receiving the DHCP acknowledgement packet, the edge RB executing a security check creates the DHCP-Snooping binding entry according to the DHCP acknowledgement packet only in a case in which it is determined that a device that sends the DHCP acknowledgement packet is a trusted RB. After receiving the DHCP acknowledgement packet, in a case in which it is determined that the device that sends the DHCP acknowledgement packet is not a trusted RB, the edge RB executing a security check discards the DHCP acknowledgement packet and gives up creating the DHCP-Snooping binding entry.

The performing DHCP-Snooping on the packet coming from the device may specifically include:

if the packet is not a TRILL packet, performing DHCP-Snooping on the packet; and if the packet is a TRILL packet, performing DHCP-Snooping on an inner packet carried in the TRILL packet.

It can be seen that, in this embodiment of the present invention, after applying DHCP snooping, the edge RB executing a security check determines whether the device that sends the packet is a trusted RB, and performs a security check on all packets coming from the device as long as the device is not a trusted RB. In other words, if the device is not a trusted RB, the packet coming from the device is considered as a packet from a user side, and a security check needs to be performed; and if the device is a trusted RB, the packet coming from the device is considered as a packet from a network side, and no security check needs to be performed.

In the method for processing a packet on a TRILL network provided by this embodiment of the present invention, a security check is not performed based on a physical port, but whether to perform a security check is determined based on an RB. When a packet comes from a trusted RB, no security check is performed on the packet coming from the trusted RB, and when a packet does not come from a trusted RB, a security check is performed on the packet without exception. In this way, the trusted RB is configured in advance by a user; therefore, packet security can be ensured to the utmost extent, and a network packet attack can be effectively defended against, thereby improving network security.

Figure 2A:
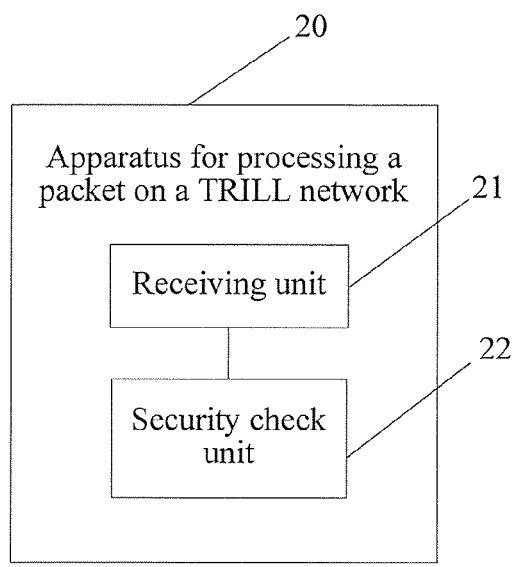
FIG. 2A is a structural block diagram of an apparatus for processing a packet on a TRILL network according to an embodiment of the present invention.

Corresponding to the foregoing method, referring to FIG. 2A, an embodiment of the present invention further provides an apparatus 20 for processing a packet on a TRILL network, and the apparatus 20 includes a receiving unit 21 and a security check unit 22, where:

the receiving unit 21 is configured to receive a packet sent by a device on a network; and the security check unit 22 is configured to: if it is determined that the device is a trusted RB, give up performing a security check on the packet coming from the device; and if it is determined that the device is not a trusted RB, perform a security check on the packet coming from the device.

In the apparatus for processing a packet on a TRILL network provided by this embodiment of the present invention, a security check is not performed based on a physical port, but whether to perform a security check is determined based on an RB. When a packet comes from a trusted RB, no security check is performed on the packet coming from the trusted RB, and when a packet does not come from a trusted RB, a security check is performed on the packet without exception. In this way, the trusted RB is configured in advance by a user; therefore, packet security can be ensured to the utmost extent, and a network packet attack can be effectively defended against, thereby improving network security.

Figure 2B:
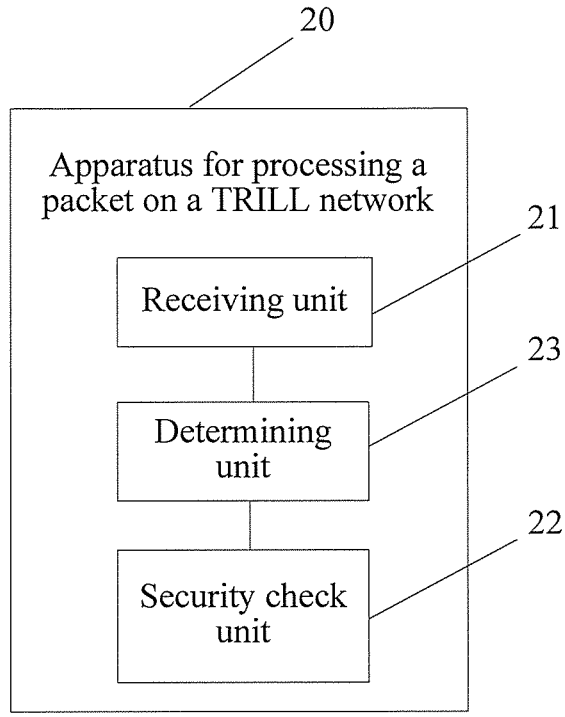
FIG. 2B is another structural block diagram of an apparatus for processing a packet on a TRILL network according to an embodiment of the present invention.

Optionally, in an embodiment of the present invention, referring to FIG. 2B, in addition to the receiving unit 21 and the security check unit 22, the apparatus 20 may further include a determining unit 23, where:

the determining unit 23 is configured to determine that the received packet is a TRILL packet and that the TRILL packet is a TRILL packet sent by a trusted routing bridge.

The apparatus 20 for processing a packet on a TRILL network provided by this embodiment of the present invention may further include a binding entry creation unit 24.

Figure 2C:
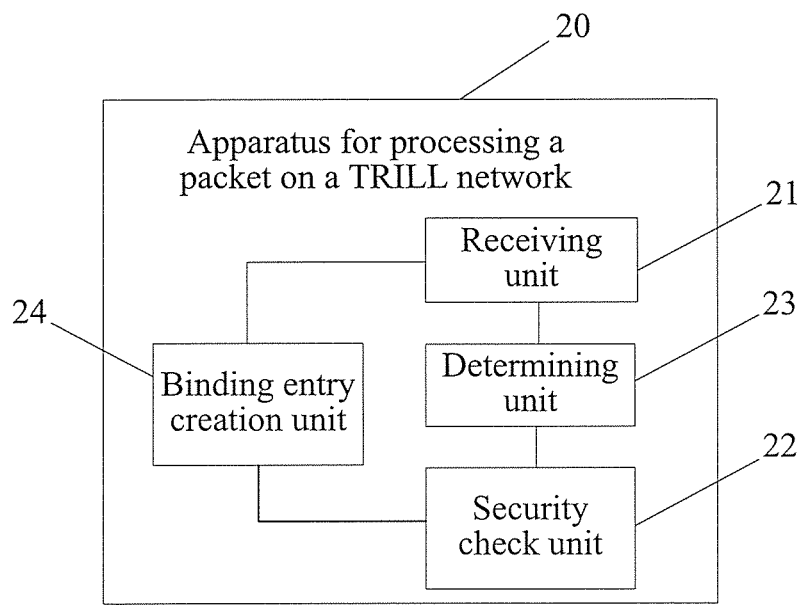
FIG. 2C is another structural block diagram of an apparatus for processing a packet on a TRILL network according to an embodiment of the present invention.

Referring FIG. 2C, optionally, in an embodiment of the present invention, the receiving unit 21 is configured to receive a Dynamic Host Configuration Protocol acknowledgement packet; and the binding entry creation unit 24 is configured to: only in a case in which it is determined that a device that sends the Dynamic Host Configuration Protocol acknowledgement packet is a trusted RB, create a DHCP-Snooping binding entry according to the Dynamic Host Configuration Protocol acknowledgement packet received by the receiving unit 21.

The security check unit 22 is specifically configured to:

perform, according to a DHCP-Snooping binding table created by the binding entry creation unit 24, DHCP-Snooping on the packet coming from the device, where the DHCP-Snooping binding table includes the DHCP-Snooping binding entry.

Figure 2D:
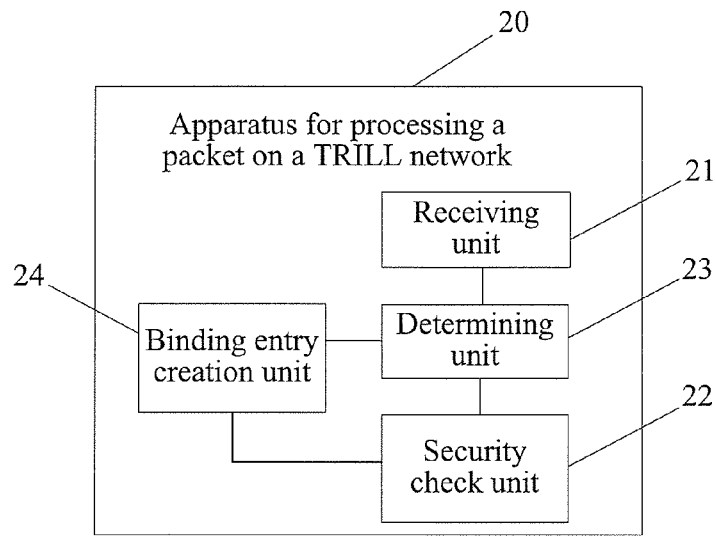
FIG. 2D is another structural block diagram of an apparatus for processing a packet on a TRILL network according to an embodiment of the present invention.

Referring to FIG. 2D, optionally, in another embodiment of the present invention, the receiving unit 21 is configured to receive a Dynamic Host Configuration Protocol acknowledgement packet; and the binding entry creation unit 24 is configured to create a DHCP-Snooping binding entry according to the Dynamic Host Configuration Protocol acknowledgement packet received by the receiving unit 21.

Further, the security check unit 22 may be specifically configured to:

perform, according to a DHCP-Snooping binding table created by the binding entry creation unit 24, DHCP-Snooping on the packet coming from the device, where the DHCP-Snooping binding table includes the DHCP-Snooping binding entry.

It is noteworthy that, in the foregoing embodiments of the apparatus for processing a packet on a TRIL TRILL network, division of the included units is merely logical function division, but the present invention is not limited to the foregoing division, as long as corresponding functions can be implemented. In addition, specific names of the functional units are merely provided for the purpose of distinguishing the units from one another, but are not intended to limit the protection scope of the present invention.

A work procedure of the apparatus for processing a packet on a TRILL network provided by this embodiment of the present invention corresponds to the method for processing a packet on a TRILL network that is described in this specification. The method for processing a packet on a TRILL network has been described in detail in the foregoing, and related descriptions in the foregoing method embodiments are also applicable to the foregoing apparatus embodiments, and therefore details are not described herein again.

Figure 3:
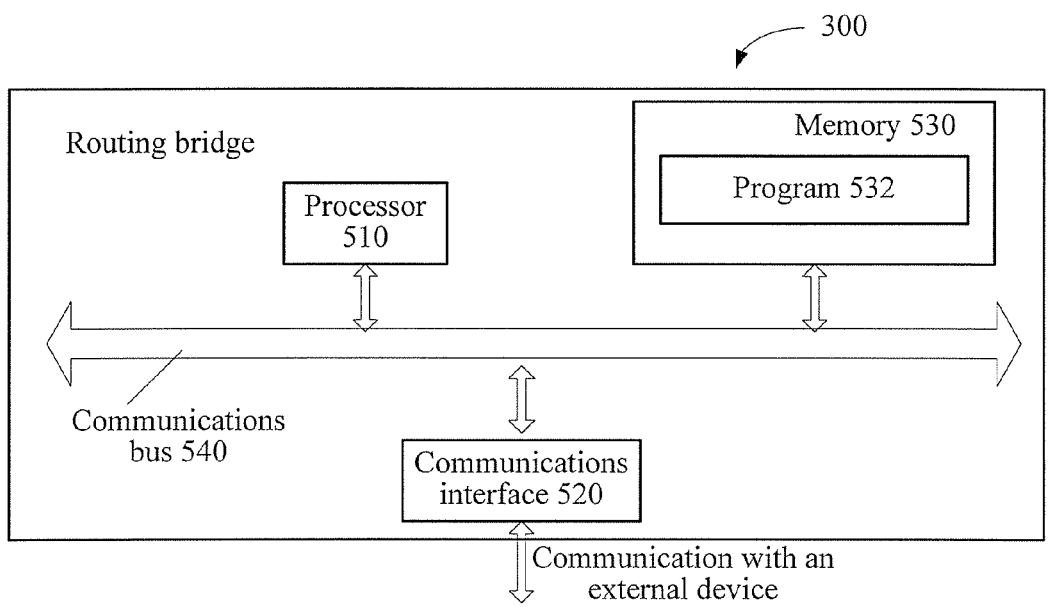
FIG. 3 is a schematic diagram of an RB according to an embodiment of the present invention.

FIG. 3 is a schematic diagram of an RB according to an embodiment of the present invention. Referring to FIG. 3, the RB 300 provided by this embodiment of the present invention may be an edge RB node, where the RB 300 may include: a processor 510, a communications interface 520, a memory 530, and a bus 540, where:

the processor 510, the communications interface 520, and the memory 530 implement mutual communication by using the bus 540;

the communications interface 520 is configured to communicate with a peripheral device; and the memory 530 is configured to store a program 532, where the memory 530 may be a volatile memory, for example, a random-access memory (RAM), and may also be a non-volatile memory, for example, a magnetic disk memory.

Specifically, the program 532 may include a computer operation instruction.

The processor 510 is a central processing unit (CPU) or a network processor (NP).

The processor 510 is configured to read the program 532, and execute: receiving a packet sent by a device on a network; if it is determined that the device is a trusted RB, giving up performing a security check on the packet coming from the device; and if it is determined that the device is not a trusted RB, performing a security check on the packet coming from the device.

In the RB provided by this embodiment of the present invention, a security check is not performed based on a physical port, but whether to perform a security check is determined based on an RB. When a packet comes from a trusted RB, no security check is performed on the packet coming from the trusted RB, and when a packet does not come from a trusted RB, a security check is performed on the packet without exception. In this way, the trusted RB is configured in advance by a user; therefore, packet security can be ensured to the utmost extent, and a network packet attack can be effectively defended against, thereby improving network security.

In an embodiment, the processor 510 is further configured to execute: determining that the received packet is a TRILL packet and that the TRILL packet is a TRILL packet sent by a trusted routing bridge.

Optionally, in an embodiment, the processor 510 is further configured to execute: before receiving the packet sent by the device on the network, receiving a Dynamic Host Configuration Protocol acknowledgement packet, and only in a case in which it is determined that a device that sends the Dynamic Host Configuration Protocol acknowledgement packet is a trusted RB, creating a DHCP-Snooping binding entry according to the Dynamic Host Configuration Protocol acknowledgement packet.

Further, the processor 510 is further configured to execute: performing, according to a DHCP-Snooping binding table, DHCP-Snooping on the packet coming from the device, where the DHCP-Snooping binding table includes the DHCP-Snooping binding entry.

Optionally, in an embodiment, the processor 510 is further configured to execute: before receiving the packet sent by the device on the network, receiving a Dynamic Host Configuration Protocol acknowledgement packet, and creating a DHCP-Snooping binding entry according to the Dynamic Host Configuration Protocol acknowledgement packet.

In the previous embodiment, further, the processor 510 is further configured to execute:

performing, according to a DHCP-Snooping binding table, DHCP-Snooping on the packet coming from the device, where the DHCP-Snooping binding table includes the DHCP-Snooping binding entry.

A computer readable medium may be a computer readable signal medium or a computer readable storage medium. The computer readable storage medium includes but is not limited to an electronic, magnetic, optical, electromagnetic, infrared, or semiconductor system, device, or apparatus, or any proper combination of the foregoing, for example, a random access memory, a read-only memory (ROM), and an erasable programmable read only memory (EPROM).

A processor in a computer reads computer readable program code that is stored in the computer readable medium, so that the processor can execute a function and an action that are specified in each step or a combination of steps in a flowchart; and generate an apparatus that implements a function and an action that are specified in each block or a combination of blocks in a block diagram.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for processing a packet on a Transparent Interconnection of Lots of Links (TRILL) network, the method comprising:
   receiving the packet sent by a device on the network;
   determining whether the packet includes an ingress Routing Bridge (RB) nickname of a trusted RB;
   giving up performing a security check on or performing a security check on the packet coming from the device based on the determination, wherein the security check on the packet coming from the device is given up when the nickname of the trusted RB is included in the packet;
   wherein the security check is performed on the packet coming from the device when the nickname of the trusted RB is not included in the packet;
   wherein before receiving the packet sent by the device on the network, the method further comprises:
   receiving a Dynamic Host Configuration Protocol (DHCP) acknowledgement packet, and only when it is determined that the device that sends the DHCP acknowledgement packet is the trusted routing bridge, creating a DHCP snooping (DHCP-Snooping) binding entry according to the DHCP acknowledgement packet.

2. The method according to claim 1, wherein performing the security check on the packet coming from the device comprises:
performing, according to a DHCP-Snooping binding table, DHCP snooping on the packet coming from the device, wherein the DHCP-Snooping binding table comprises the DHCP-Snooping binding entry.

3. An apparatus for processing a packet on a Transparent Interconnection of Lots of Links (TRILL) network, the apparatus comprising:
a receiving unit, configured to:
receive the packet sent by a device on the network; and
receive a Dynamic Host Configuration Protocol (DHCP) acknowledgement packet;
a determining unit, configured to determine whether the packet sent by the device on the network includes an ingress Routing Bridge (RB) nickname of a trusted RB; and
a security check unit, configured to:
give up performing a security check on or perform a security check on the packet coming from the device based on the determination, wherein the security check on the packet coming from the device is given up when the nickname of the trusted RB is included in the packet;
wherein the security check is performed on the packet coming from the device when the nickname of the trusted RB is not included in the packet; and
a binding entry creation unit configured to:
only when it is determined that the device that sends the DHCP acknowledgement packet is the trusted routing bridge, create a Dynamic Host Configuration Protocol snooping (DHCP-Snooping) binding entry according to the DHCP acknowledgement packet received by the receiving unit.

4. The apparatus according to claim 3, wherein:
the security check unit is configured to perform, according to a DHCP-Snooping binding table, DHCP Snooping on the packet coming from the device, wherein the DHCP-Snooping binding table comprises the DHCP-Snooping binding entry.

5. A routing bridge, comprising:
a hardware processor, a communications interface, a memory, and a bus configured to implement mutual communication;
the communications interface is configured to communicate with a peripheral device;
the memory is configured to store a program;
the hardware processor is configured to execute the program and configured to:
receive a packet sent by a device on a network,
give up performing a security check on or perform a security check on the packet coming from the device based on whether the packet includes an ingress Routing Bridge (RB) nickname of a trusted RB, wherein the security check on the packet coming from the device is given up when the nickname of the trusted RB is included in the packet;
wherein the security check is performed on the packet coming from the device when the nickname of the trusted RB is not included in the packet; and
before receiving the packet sent by the device on the network, receive a Dynamic Host Configuration Protocol (DHCP) acknowledgement packet, and only when it is determined that the device that sends the DHCP acknowledgement packet is the trusted routing bridge, create a Dynamic Host Configuration Protocol snooping (DHCP-Snooping) binding entry according to the DHCP acknowledgement packet.

6. The routing bridge according to claim 5, wherein the hardware processor is further configured to:
perform, according to a DHCP-Snooping binding table, DHCP snooping on the packet coming from the device, wherein the DHCP-Snooping binding table comprises the DHCP-Snooping binding entry.

* * * * *